United States Patent
Chen et al.

(10) Patent No.: US 12,058,023 B2
(45) Date of Patent: Aug. 6, 2024

(54) STAGING IN-PLACE UPDATES OF PACKET PROCESSING RULES OF NETWORK DEVICES TO ELIMINATE PACKET LEAKS

(71) Applicant: Arista Networks, Inc., Santa Clara, CA (US)

(72) Inventors: Michael Chen, Santa Clara, CA (US); Peter Delevoryas, Santa Clara, CA (US); Eswaran Baskaran, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 353 days.

(21) Appl. No.: 17/511,470

(22) Filed: Oct. 26, 2021

(65) Prior Publication Data

US 2022/0417130 A1 Dec. 29, 2022

Related U.S. Application Data (60) Provisional application No. 63/215,896, filed on Jun. 28, 2021.

(51) Int. Cl.
*H04L 45/02* (2022.01)
(52) U.S. Cl.
CPC .................................. *H04L 45/02* (2013.01)
(58) Field of Classification Search
CPC ...................................................... H04L 45/02
See application file for complete search history.

(56) References Cited

U.S. PATENT DOCUMENTS

| | | | | |
|---|---|---|---|---|
| 6,360,217 B1 * | 3/2002 | Gopal | ................. | G06Q 10/109 |
| 8,750,144 B1 * | 6/2014 | Zhou | ...................... | H04L 45/54 |
| | | | | 709/224 |
| 9,444,847 B2 * | 9/2016 | Zhang | ................. | H04L 41/0893 |
| 10,129,088 B2 * | 11/2018 | Sharma | ................. | H04L 63/101 |
| 2006/0190804 A1 * | 8/2006 | Yang | ...................... | G06F 40/186 |
| | | | | 715/236 |
| 2013/0070753 A1 * | 3/2013 | Sahni | .................... | H04L 45/021 |
| | | | | 370/351 |
| 2013/0166491 A1 * | 6/2013 | Zhang | ..................... | G06N 5/02 |
| | | | | 706/47 |

(Continued)

FOREIGN PATENT DOCUMENTS

| | | | |
|---|---|---|---|
| CN | 101035062 A | * | 9/2007 |
| CN | 109754021 A | * | 5/2019 |

(Continued)

*Primary Examiner* — Shean Tokuta
(74) *Attorney, Agent, or Firm* — Fountainhead Law Group, PC (57) ABSTRACT

Embodiments of the present disclosure include systems and methods for updating packet processing rules of network devices. A request to update a first set of rules stored in the memory with a second set of rules is received. Upon determining the update from the first set of rules to the second set of rules satisfies a defined condition, the first set of rules in the memory is updated with the second set of rules. Upon determining the update from the first set of rules to the second set of rules does not satisfy the defined condition, the update from the first set of rules to the second set of rules is decomposed into a first set of operations and a second set of operations and the first set of rules in the memory are updated with the second set of rules.

20 Claims, 7 Drawing Sheets

(56) References Cited

U.S. PATENT DOCUMENTS

| | | | | |
|---|---|---|---|---|
| 2014/0279850 | A1* | 9/2014 | Goyal | G06F 16/11 |
| | | | | 707/609 |
| 2017/0094036 | A1* | 3/2017 | Almog | H04L 45/74591 |
| 2017/0126768 | A1* | 5/2017 | Tucker | H04L 65/613 |
| 2018/0114123 | A1* | 4/2018 | Kim | G06N 5/025 |
| 2019/0372889 | A1* | 12/2019 | Michael | H04L 45/70 |
| 2020/0007546 | A1* | 1/2020 | Valiquette | H04L 63/20 |
| 2020/0403869 | A1* | 12/2020 | Chen | H04L 41/5022 |
| 2020/0412615 | A1* | 12/2020 | Baskaran | G06N 5/025 |
| 2021/0144159 | A1* | 5/2021 | Sanghvi | H04L 63/1425 |
| 2022/0417130 | A1* | 12/2022 | Chen | H04L 45/02 |

FOREIGN PATENT DOCUMENTS

| | | | | | |
|---|---|---|---|---|---|
| CN | 114490765 | A | * | 5/2022 | |
| CN | 116050559 | A | * | 5/2023 | ....... G05B 19/41865 |
| CN | 116070988 | A | * | 5/2023 | |

* cited by examiner

FIG. 1

Packet Processing Rules 200

Rule 1: match ip any host 1.1.1.1 set nexthop 8.8.8.8
Rule 2: match ip any host 2.2.2.2 set nexthop 8.8.8.8
Rule 3: match ip any host 3.3.3.3 set nexthop 8.8.8.8

FIG. 2

Packet Processing Rules 300

Rule 1: match ip any host 1.1.1.1 set nexthop 8.8.8.8
Rule 2: match ip any host 2.2.2.2 set nexthop 8.8.8.8
Rule 3: match ip any host 4.4.4.4 set nexthop 8.8.8.8
Rule 4: match ip any host 3.3.3.3 set nexthop 8.8.8.8

FIG. 3

Packet Processing Rules 400

Rule 1: match ip any host 1.1.1.1 set nexthop 8.8.8.8
Rule 2: match ip any host 3.3.3.3 set nexthop 8.8.8.8

FIG. 4

Packet Processing Rules 500

Rule 1: match ip any host 2.2.2.2 set nexthop 8.8.8.8
Rule 2: match ip any host 3.3.3.3 set nexthop 8.8.8.8
Rule 3: match ip any host 4.4.4.4 set nexthop 8.8.8.8

Packet Processing Rules 200

Rule 1: match ip any host 1.1.1.1 set nexthop 8.8.8.8
Rule 2: match ip any host 2.2.2.2 set nexthop 8.8.8.8
Rule 3: match ip any host 3.3.3.3 set nexthop 8.8.8.8

FIG. 7A

Packet Processing Rules 700

Rule 1: match ip any host 1.1.1.1 set nexthop 8.8.8.8
Rule 2: match ip any host 2.2.2.2 set nexthop 8.8.8.8
Rule 3: match ip any host 3.3.3.3 set nexthop 8.8.8.8
Rule 4: match ip any host 4.4.4.4 set nexthop 8.8.8.8

FIG. 7B

Packet Processing Rules 500

Rule 1: match ip any host 2.2.2.2 set nexthop 8.8.8.8
Rule 2: match ip any host 3.3.3.3 set nexthop 8.8.8.8
Rule 3: match ip any host 4.4.4.4 set nexthop 8.8.8.8

STAGING IN-PLACE UPDATES OF PACKET PROCESSING RULES OF NETWORK DEVICES TO ELIMINATE PACKET LEAKS

CROSS-REFERENCE TO RELATED APPLICATION

The present application claims the benefit and priority of U.S. Provisional Application No. 63/215,896, filed Jun. 28, 2021, entitled "In-Place Update of Arbitrary Rule Updates," the entire contents of which are incorporated herein by reference in its entirety for all purposes.

BACKGROUND

Network devices typically use some type of content-addressable memory (CAM) to express packet classifiers (packet processing rules) and associated actions to process packets. The use of CAM technology allows for high throughput processing of packets. A commonly used type of CAM is a ternary CAM (TCAM) because its three data state memory can provide wildcard capability for matching packets. When packet processing rules are updated, users want to be able to install the updates to the network device without causing any traffic leaks or otherwise impacting ongoing processing of packets in the network device.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for updating packet processing rules of network devices. In some embodiments, a network device includes memory configured to store rules for processing packets that the network device receives. The network device may receive a new set of packet processing rules and a request to update the current set of rules stored in the memory with the new set of rules. In order to perform the update, the network device can determine whether the update includes only rule additions to the current set of packet processing rules or only rule deletions of rules in the current set of packet processing rules. If so, the network device performs the rule additions or the rule deletions to the current set of packet processing rules stored in the memory. In some embodiments, when the network device determines that the update includes only rule additions to the current set of packet processing rules or only rule deletions of rules in the current set of packet processing rules, the network device decomposes the update into a set of rule addition operations and a set of rule deletion operations. Next, the network device applies the set of rule addition operations to the current set of packet processing rules stored in memory. Then, the network device applies the set of rule deletion operations on the rules stored in the memory. In other embodiments, when the network device determines that the update includes only rule additions to the current set of packet processing rules or only rule deletions of rules in the current set of packet processing rules, the network device blocks the update of the current set of rules with the new set of rules, that is, the network device does not allow the update to occur to prevent possible traffic leaks from occurring during the update.

The techniques described in the present application provide a number of benefits and advantages over conventional methods for updating packet processing rules of network devices. For instance, performing updates to packet processing rules in the manner described above prevents traffic leaks (e.g., packets are not forwarded correctly, packets erroneously dropped, etc.) from occurring during the updates. This improves the operation of the network device by eliminating incorrect processing of packets.

Figure 1:
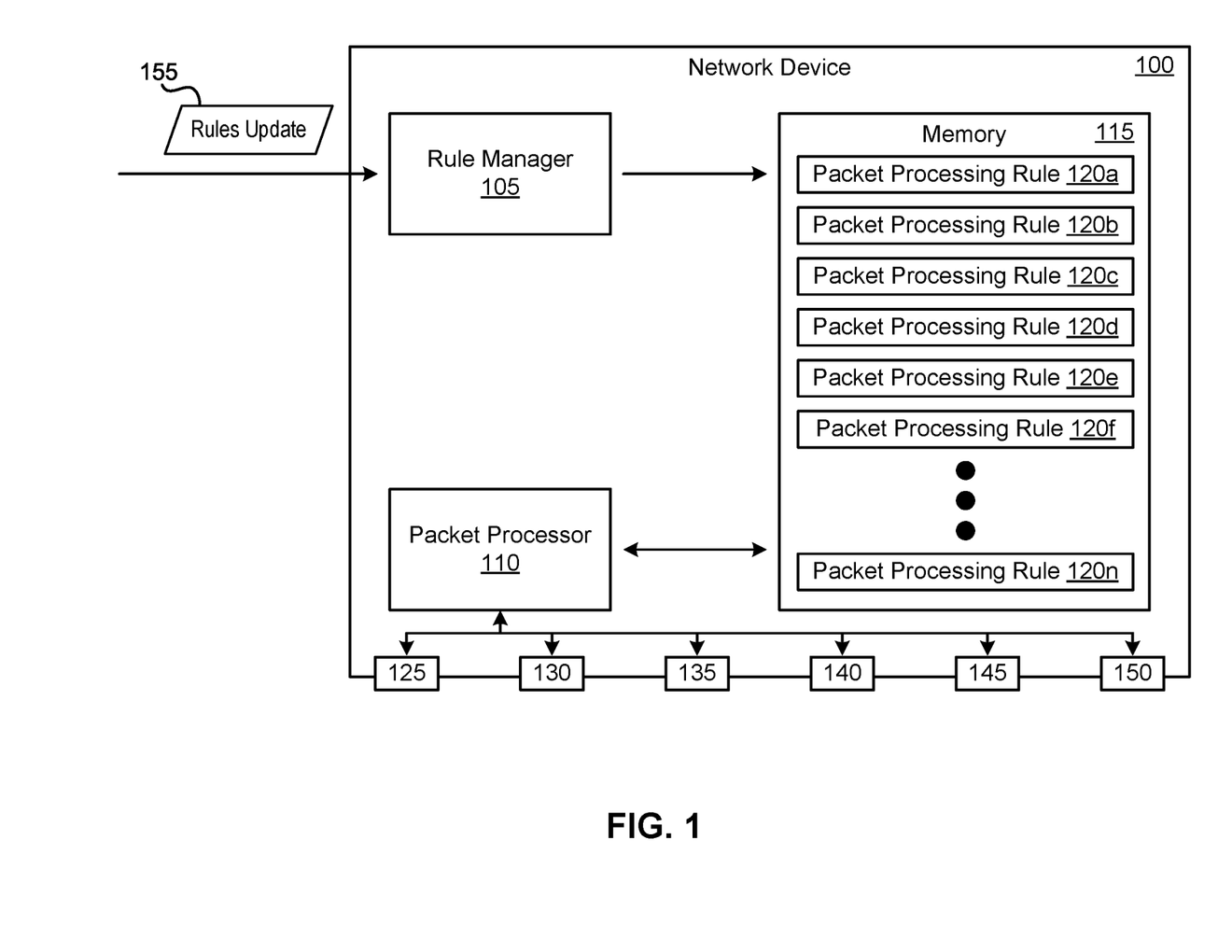
FIG. 1 illustrates a network device according to some embodiments.

FIG. 1 illustrates a network device 100 according to some embodiments. As shown, network device includes rule manager 105, packet processor 110, memory 115, and ports 125-150. Each of the ports 125-150 can be an Ethernet port in some embodiments. Memory 115 is configured to store packet processing rules. As illustrated in FIG. 1, memory 115 includes packet processing rules 120*a-n*. Each of the packet processing rules 120*a-n* may include a set of matching criteria and a set of actions. In some embodiments, memory 115 is content-addressable memory (CAM). In some such embodiments, memory 115 is ternary content-addressable memory (TCAM).

Rule manager 105 is responsible for managing packet processing rules in memory 115. For example, as depicted in FIG. 1, rule manager 105 can receive (e.g., from a user of network device 100) rules update 155 and a request to update packet processing rules 120*a-n* stored in memory 115 with the set of rules specified in rules update 155. In response to the request, rule manager 105 determines whether the update of packet processing rules 120*a-n* with rules update 155 satisfies a defined condition. Different defined conditions can be used in different embodiments. For instance, in some embodiments, the defined condition is a rules update that includes only rule additions or only rule deletions. In the example shown in FIG. 1, rule manager 105 determines whether rules update 155 includes only rule additions to packet processing rules 120a-n or only rule deletions of packet processing rules 120a-n.

Rule manager 105 can use any number of different techniques to determine whether a rules update includes only rule additions to a set of packet processing rules or only rule deletions of rules in the set of packet processing rules. For example, in some embodiments, rule manager 105 makes such a determination by determining the number of rules in the rules update and determining the number of rules in the current set of packet processing rules stored in memory 115. Next, rule manager 105 selects a rule from the set of packet processing rules with the lower number of rules (i.e., the rules update or the current set of packet processing rules stored in memory 115) and checks whether the selected rule is included in the set of packet processing rules with the larger number of rules. If the number of rules in each set are equal, rule manager 105 just selects one to be the smaller set of rules and the other to be the larger set of rules. Rule manager 105 iteratively selects remaining rules in the smaller set of rules and processes them against the larger set of rules until no rules are left in the smaller set of rules. If a selected rule is not included in the larger set of rules, rule manager 105 determines that the rules update does not include only rule additions or only rule deletions. If all the rules in the smaller set of rules are included in the larger set of rules, rule manager 105 determines whether the rules in the smaller set of rules are in the same priority order as the rules in the larger set of rules. If they are in the same priority order, rule manager 105 determines that the rules update includes only rule additions or only rule deletions. Otherwise, rule manager 105 determines the rules update does not include only rule additions or only rule deletions.

If rule manager 105 determines that the rules update 155 satisfies the defined condition (e.g., includes only rule additions to packet processing rules 120a-n or only rule deletions of packet processing rules 120a-n), rule manager 105 applies rules update 155 to packet processing rules 120a-n (e.g., by applying the rule additions to packet processing rules 120a-n or applying the rule deletions to packet processing rules 120a-n). In some embodiments, if rule manager 105 determines that the update of packet processing rules 120a-n with rules update 155 does not satisfy the defined condition, rule manager 105 decomposes rules update 155 into two sets of operations and applies the sets of operations successively. For example, rule manager 105 can decompose rules update 155 into a set of rule addition operations and a set of rule deletion operations. Rule manager 105 may use any number of different techniques for decomposing rules update 155 into a set of rule addition operations and a set of rule deletion operations. For instance, in some embodiments, rule manager 105 uses a Myers diff algorithm to decompose rules update 155 into the two sets of operations. Once rules update 155 has been decomposed, rule manager 105 applies the set of rule addition operations to memory 115. Rule manager 105 then applies the set of rule deletion operations to memory 115. In other embodiments, if rule manager 105 determines that the update of packet processing rules 120a-n with rules update 155 does not satisfy the defined condition, rule manager 105 blocks the update of packet processing rules 120a-n with rules update 155. In other words, rule manager 105 prevents rules update 155 from occurring.

Packet processor 110 is configured to process packets received via ports 125-150. For instance, when packet processor 110 receives a packet through one of the ports 125-150, packet processor 110 performs a lookup on memory 115 to determine whether the packet matches one of the packet processing rules 120-n. In some embodiments, packet processor 110 determines a packet processing rule 120 matches the packet when values of attributes in the header of the packet matches the set of criteria specified in the packet processing rule 120. For a packet processing rule 120 that matches the packet, packet processor 110 processes the packet (e.g., forwards the packet out one of one the ports 125-150) based on the set of actions specified in the packet processing rule 120.

Figure 2:
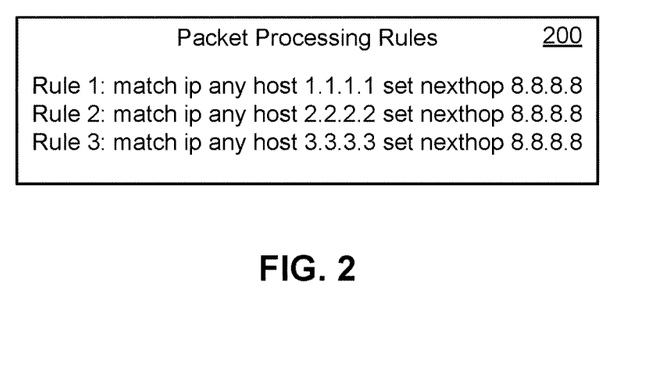
FIG. 2 illustrates an example set of packet processing rules according to some embodiments.

Several examples of updates performed on packet processing rules will now be described by reference to FIGS. 1-7. For these examples, the defined condition that rule manager 105 uses is the following: a rules update includes only rule additions or only rule deletions. Additionally, the packet processing rules in these examples are prioritized according to the rule number/position. For instance, rule 1 has a higher priority than rule 2, rule 2 has a higher priority than rule 3, and so on and so forth. This is because a packet may match multiple packet processing rules. With rule priorities, the rule with the highest priority is determined to be the rule that matches the packet and, thus, used to process the packet accordingly. FIG. 2 illustrates an example set of packet processing rules 200 according to some embodiments. Specifically, the set of packet processing rules 200 will be the used as the current set of packet processing rules stored in memory 115 for these examples. As shown, the set of packet processing rules 200 includes three rules 1-3. Each of the rules 1-3 includes a set of matching criteria and a set of actions. The set of matching criteria for rule 1 specifies (1) match based on Internet Protocol (IP) addresses, (2) the source IP address can be any value, and (3) the destination IP address is 1.1.1.1. Rules 2 and 3 have the same set of criteria but with different destination IP address values. The set of actions for rule 1 specifies to set the nexthop IP address to be the value 8.8.8.8. Rules 2 and 3 have the same set of actions with the same nexthop IP address.

Figures 3, 5:
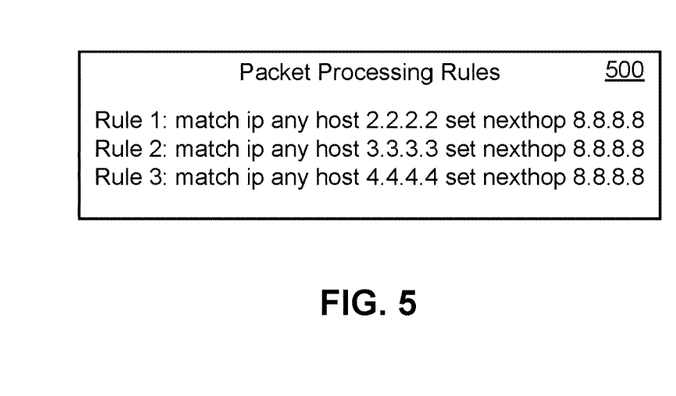
FIG. 3 illustrates an example rules update to the set of packet processing rules illustrated in FIG. 2 that includes only rule additions according to some embodiments.
FIG. 5 illustrates another example rules update to the set of packet processing rules illustrated in FIG. 2 that includes rule additions and rule deletions according to some embodiments.

A first example will demonstrate how to process an update to the set of packet processing rules 200 that includes only rule additions. FIG. 3 illustrates an example rules update 300 to the set of packet processing rules 200 that includes only rule additions according to some embodiments. As depicted, rules update 300 includes four rules 1-4 listed in priority order. Rules 1, 2, and 4 in rules update 300 correspond to rules 1-3 in the set of packet processing rules 200. In this example, rules update 300 adds a rule between rules 2 and 3 in the set of packet processing rules 200. When rule manager 105 receives rules update 300 and a request to update the packet processing rules stored in memory 115 (the set of packet processing rules 200 in this example), rule manager 105 determines whether the update of packet processing rules 200 with rules update 300 includes only rule additions to packet processing rules 200 or only rule deletions of rules in packet processing rules 200. Here, rule manager 105 determines that rules update 300 satisfies the defined condition since rules update 300 includes only a rule addition to the set of packet processing rules 200. As such, rule manager 105 applies the rule addition to the set of packet processing rules 200 stored in memory 115 by inserting rule 3 in rules update 300 between rules 2 and 3 of packet processing rules 200. After the update, the rules shown in rules update 300 are stored in memory 115.

Figure 4:
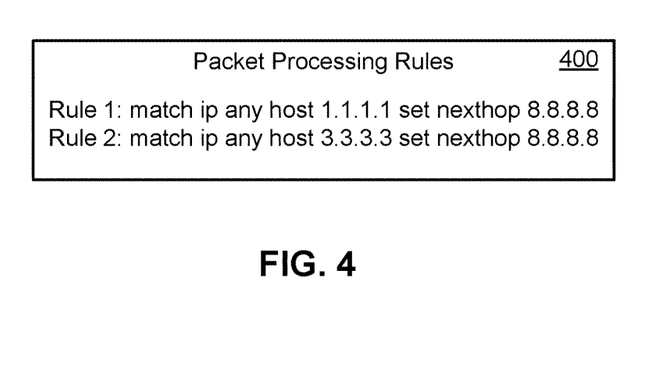
FIG. 4 illustrates another example rules update to the set of packet processing rules illustrated in FIG. 2 that includes only rule deletions according to some embodiments.

A second example will demonstrate how to process an update to the set of packet processing rules 200 that includes only rule deletions. FIG. 4 illustrates another example rules update 400 to the set of packet processing rules 200 that includes only rule deletions according to some embodiments. As illustrated in FIG. 4, rules update 400 includes rules 1 and 2. Rules 1 and 2 in rules update 400 correspond to rules 1 and 3 in the set of packet processing rules 200. For this example, rules update 400 deletes rule 2 from the set of packet processing rules 200. Once rule manager 105 receives rules update 400 and a request to update the packet processing rules stored in memory 115 (the set of packet processing rules 200 in this example), rule manager 105 determines whether the update of packet processing rules 200 with rules update 400 includes only rule additions to packet processing rules 200 or only rule deletions of rules in packet processing rules 200. In this example, rule manager 105 determines that rules update 400 satisfies the defined condition because rules update 400 includes only a rule deletion of a rule in the set of packet processing rules 200. Thus, rule manager 105 applies the rule deletion to the set of packet processing rules 200 stored in memory 115 by deleting rule 2 from the set of packet processing rules 200. After the update, the rules shown in rules update 400 are stored in memory 115. The example described by reference to FIG. 4 shows a single rule deleted during a rules update. In some cases, a rules update may include multiple rules being deleted. In some such cases, rule manager 105 performs the rule deletions from lowest priority to highest priority (i.e., the lowest priority rule to be deleted is deleted first, the second lowest priority rule to be deleted is deleted second, the third lowest priority rule to be deleted is deleted third, etc.).

A third example will demonstrate how to process an update to the set of packet processing rules 200 that includes rule additions and rule deletions. FIG. 5 illustrates another example rules update 500 to the set of packet processing rules 200 that includes rule additions and rule deletions according to some embodiments. As shown, rules update 500 includes rules 1-3 listed in priority order. Rules 1 and 2 in rules update 500 correspond to rules 2 and 3 in the set of packet processing rules 200. Here, rules update 500 adds rule 3 shown in rules update 500 to the set of packet processing rules 200. In addition, rules update 500 deletes rule 1 from the set of packet processing rules 200. When rule manager 105 receives rules update 500 and a request to update the packet processing rules stored in memory 115 (the set of packet processing rules 200 in this example), rule manager 105 determines whether the update of packet processing rules 200 with rules update 500 includes only rule additions to packet processing rules 200 or only rule deletions of rules in packet processing rules 200. For this example, rule manager 105 determines that rules update 500 does not satisfy the defined condition as rules update 500 includes both a rule addition to the set of packet processing rules 200 and a rule deletion of a rule in the set of packet processing rules 200.

Figure 6:
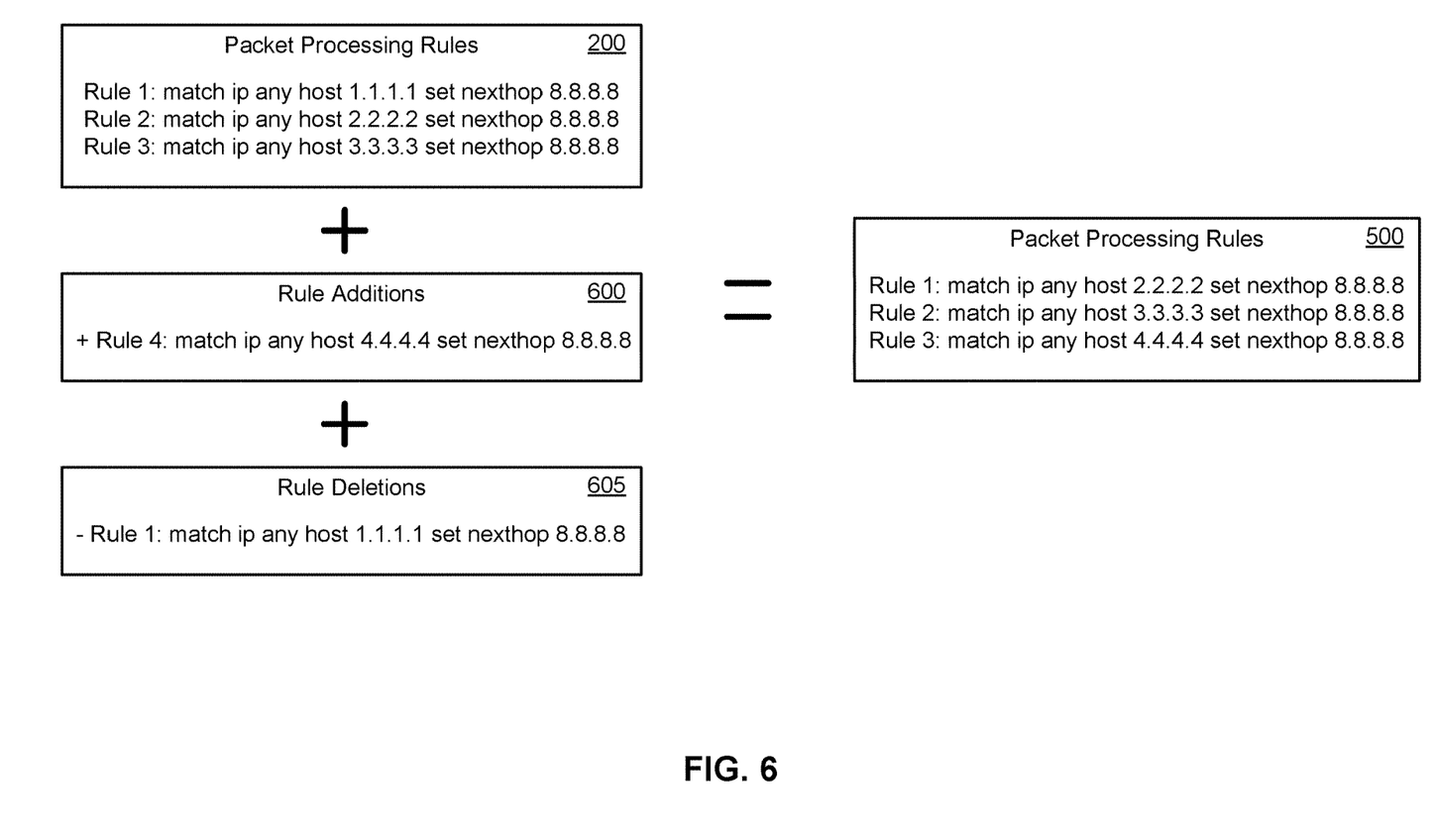
FIG. 6 illustrates the decomposition of the rules update of the set of packet processing rules illustrated in FIG. 5 into rule addition operations and rule deletion operations according to some embodiments.

Therefore, rule manager 105 decomposes rules update 500 into a set of rule addition operations and a set of rule deletion operations. FIG. 6 illustrates the decomposition of rules update 500 into rule addition operations and rule deletion operations according to some embodiments. As illustrated in FIG. 6, rules update 500 is decomposed into a set of rule addition operations 600 and a set of rule deletion operations 605, which are both applied to the set of packet processing rules 200 to arrive at rules update 500. In this example, rule manager 105 uses a Myers diff algorithm to decompose rules update 300 to the set of packet processing rules 200 into set of operations 600 and set of operations 605. However, one of ordinary skill in the art will understand that any number of different techniques for decomposing rules update into rule addition operations and rule deletion operations can be used.

Figure 7A:
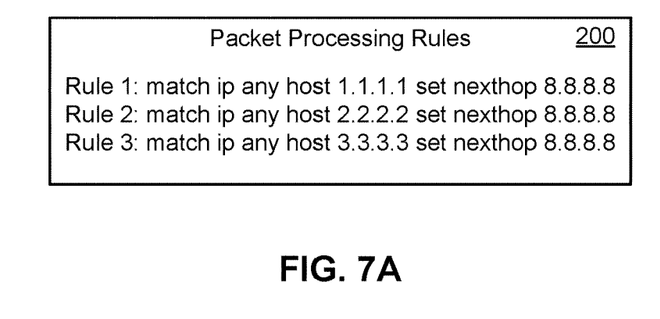
FIGS. 7A-7C illustrate implementing the rules update illustrated in FIG. 5 to the set of packet processing rules illustrated in FIG. 2 based on the rule addition operations and the rule deletion operations illustrated in FIG. 6 according to some embodiments.
Figure 7B:
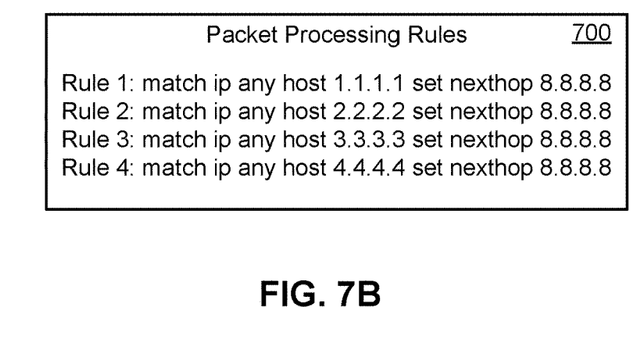
Figure 7C:
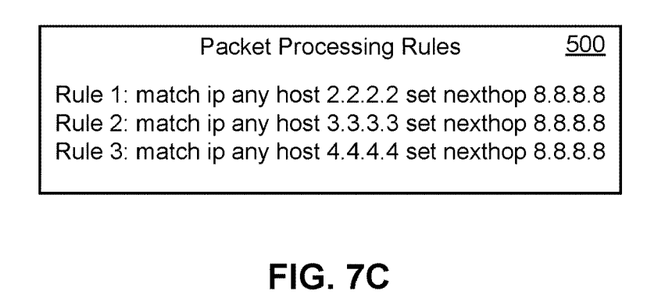

Once rule manager 105 decomposes rules update 500 into the different sets of operations, rule manager 105 successively applies each set of operations. FIGS. 7A-7C illustrate implementing rules update 500 to the set of packet processing rules 200 based on the rule addition operations and the rule deletion operations illustrated in FIG. 6 according to some embodiments. FIG. 7A illustrates the set of packet processing rules 200 according to some embodiments. In particular, the set of packet processing rules 200 are currently stored in memory 115 for this example. FIG. 7B illustrates the set of packet processing rules 200 after the set of rule addition operations 600 are applied. FIG. 7B shows a set of packet processing rules 700, which are the packet processing rules now stored in memory 115. Here, rule manager 105 applies the set of rule addition operations 600 by adding rule 4 after rule 3 of the set of packet processing rules 200. FIG. 7C illustrates the set of packet processing rules 700 after the set of rule deletion operations 605 are applied. In particular, FIG. 7C illustrate the set of packet processing rules 500, which are now stored in memory 115. For this example, rule manager 105 applies the set of rule deletion operations 605 by deleting rule 1 from the set of packet processing rules 700.

The example described above by reference to FIGS. 4-7 shows how, when a rules update is determined to include rule additions as well as rule deletions, the rules update can be decomposed into a set of rule additions and a set of rule deletions and the different sets of operations successively applied. In some embodiments, instead of using this technique to apply the rules update, rule manager 105 simply blocks the rules update from occurring.

Figure 8:
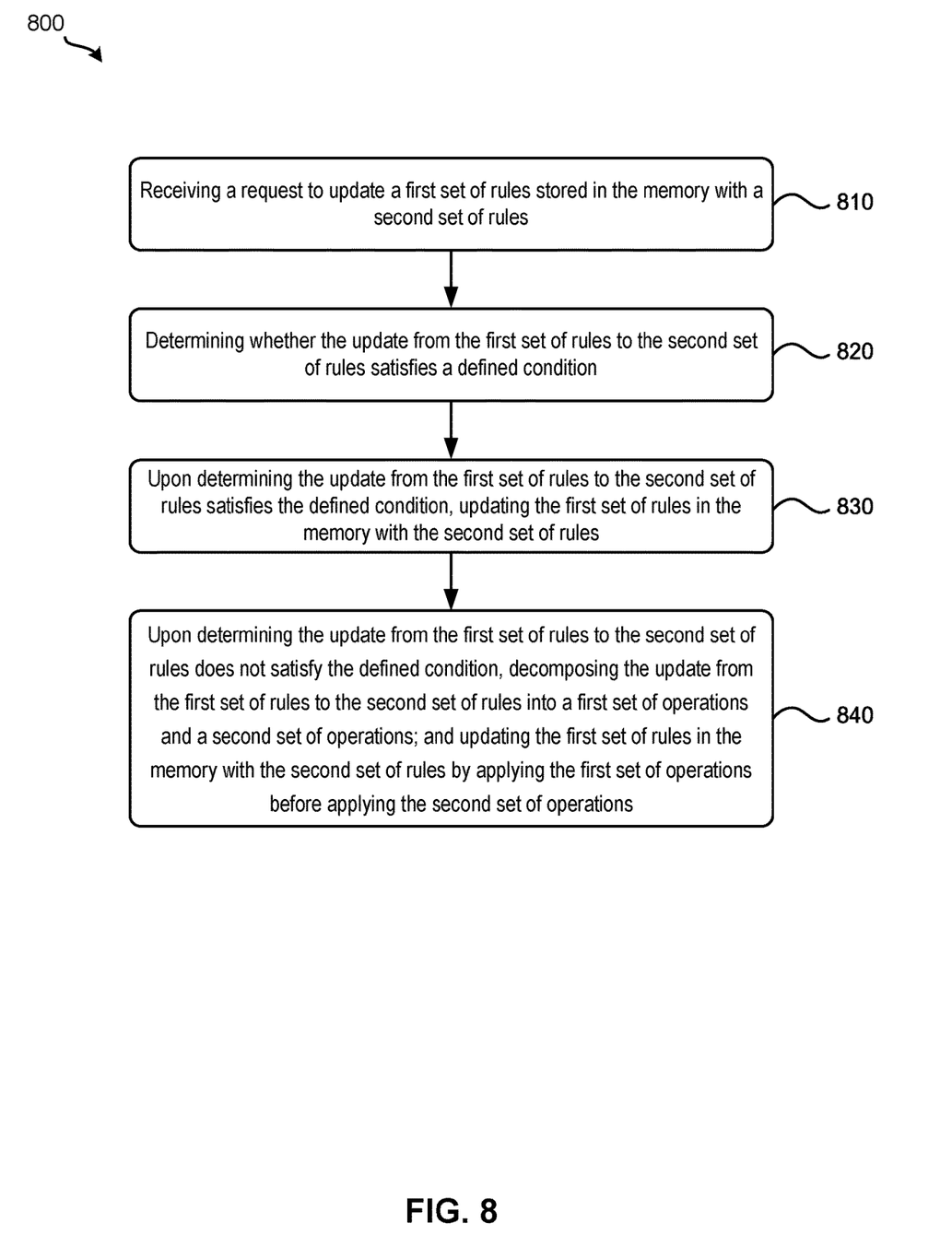
FIG. 8 illustrates a process for updating packet processing rules according to some embodiments.

FIG. 8 illustrates a process 800 for updating packet processing rules according to some embodiments. In some embodiments, rule manager 105 performs process 800. Process 800 begins by receiving, at 810, a request to update a first set of rules stored in the memory with a second set of rules. Referring to FIGS. 1, 2, and 5 as an example, rule manager 105 may receive a request to update the set of packet processing rules 200 stored in memory 115 with rules update 500.

Next, process 800 determines, at 820, whether the update from the first set of rules to the second set of rules satisfies a defined condition. Using a rules update that includes only rule additions or only rule deletions as the defined condition and referring to FIGS. 1, 2, and 5 as an example, rule manager 105 can determine whether the update of packet processing rules 200 with rules update 500 includes only rule additions to packet processing rules 200 or only rule deletions of rules in packet processing rules 200.

Upon determining the update from the first set of rules to the second set of rules satisfies the defined condition, process 800 then updates, at 830, the first set of rules in the memory with the second set of rules. Referring to FIGS. 1-3 as an example, when rule manager 105 determines the update of packet processing rules 200 with rules update 300 includes only rule additions to packet processing rules 200, rule manager applies the rule additions to the set of packet processing rules 200 stored in memory 115 by inserting rule 3 in rules update 300 between rules 2 and 3 of packet processing rules 200. Referring to FIGS. 1, 2, and 4 as an example, when rule manager 105 determines the update of packet processing rules 200 with rules update 400 includes only rule deletions of rules in packet processing rules 200, rule manager applies the rule deletions to the set of packet processing rules 200 stored in memory 115 by deleting rule 2 from the set of packet processing rules 200.

Finally, at 840, upon determining the update from the first set of rules to the second set of rules does not satisfy the defined condition, process 800 decomposes the update from the first set of rules to the second set of rules into a first set of operations and a second set of operations and updates the first set of rules in the memory with the second set of rules by applying the first set of operations before applying the second set of operations. Referring to FIGS. 1, 2 and 5-7 as an example, when rule manager 105 determines that rules update 500 does not satisfy the defined condition because rules update 500 includes both a rule addition to the set of packet processing rules 200 and a rule deletion of a rule in the set of packet processing rules 200, rule manager decomposes the update from the set of packet processing rules 200 to rules update 500 into the set of rule addition operations 600 and the set of rule deletion operations 605. Then, rule manager 105 applies the set of rule addition operations 600 to the set of packet processing rules 200 to form the set of packet processing rules 700, as depicted in FIG. 7B. Next, rule manager 105 applies the set of rule deletion operations 605 to the set of packet processing rules 700 to form the set of packet processing rules 500, as shown in FIG. 7C. In some embodiments, instead of performing operation 840, process 800 blocks the update from the first set of rules to the second set of rules. That is, process 800 does not allow the update to occur.

Figure 9:
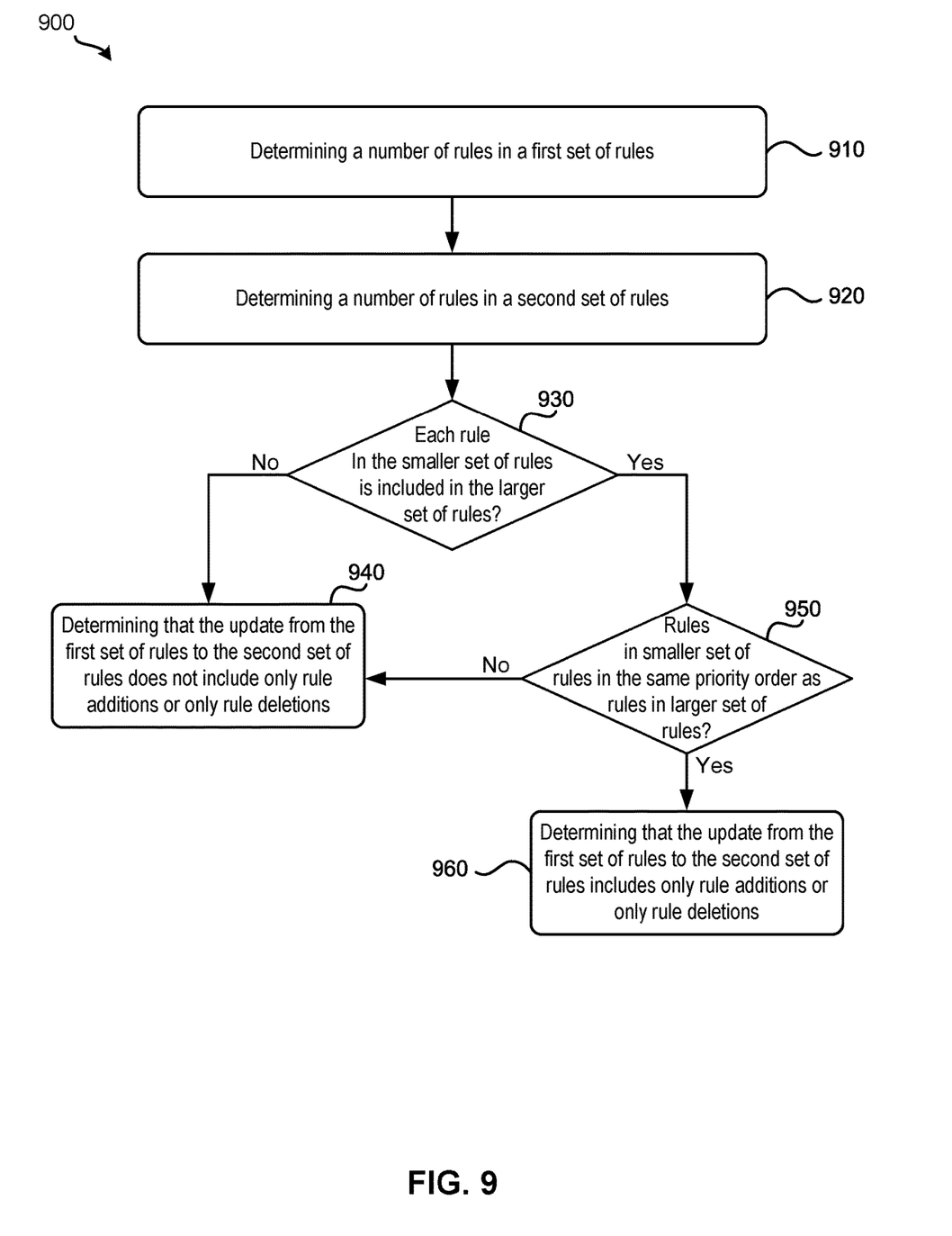
FIG. 9 illustrates a process for determining whether an update contains only rule additions or only rule deletions according to some embodiments.

FIG. 9 illustrates a process 900 for determining whether an update contains only rule additions or only rule deletions according to some embodiments. In some embodiments, rule manager 105 performs process 900 as part of operation 820 when the defined condition is a rules update that includes only rule additions or only rule deletions. Process 900 starts by determining, at 910, a number of rules in a first set of rules. Referring to FIGS. 1 and 2 as an example, rule manager 105 determines the number of rules in the set of packet processing rules 200.

Next, process 900 determines, at 920, a number of rules in a second set of rules. Referring to FIGS. 1 and 4 as an example, rule manager 105 determines the number of rules in rules update 400. Process 900 then determines which one of the first set of rules and the second set of rules has the lower number of rules, designates it as the smaller set of rules, and designates the other set of rules as the larger set of rules. If the number of rules in each set are equal, rule manager 105 just selects one to be the smaller set of rules and the other to be the larger set of rules. Here, process 900 designates rules update 400 as being the smaller set of rules and the set of packet processing rules 200 as being the larger set of rules.

Then, process 900 determines, at 930, whether each rule in the smaller set of rules is included in the larger set of rules. If so, process 900 continues to operation 950. Otherwise, process 900 determines, at 940, that the update from the first set of rules to the second set of rules does not include only rule additions or only rule deletions. Referring to FIGS. 1, 2, and 4 as an example, rule manager 105 determines whether each rule in rules update 400 is included in the set of packet processing rules 200 by selecting a rule from rules update 400 and checking whether the selected rule is included in the set of packet processing rules 200. Rule manager 105 iteratively selects remaining rules in rules update 400 and processes them against the set of packet processing rules 200 until no rules are left in rules update 400. If a selected rule is not included in the set of packet processing rules 200, rule manager 105 determines that rules update 400 does not include only rule additions or only rule deletions.

Process 900 determines, at 950, whether the rules in the smaller set of rules are in the same order as the rules in the larger set of rules. If not, process 900 proceeds to operation 940. Otherwise, process 900 determines, at 960, that the update from the first set of rules to the second set of rules includes only rule additions or only rule deletions. Referring to FIGS. 1, 2, and 4 as an example, if all the rules in rules update 400 are included in the set of packet processing rules 200, rule manager 105 determines whether the rules in rules update 400 are in the same order as the rules in the set of packet processing rules 200. If they are in the same order, rule manager 105 determines that rules update 400 includes only rule additions or only rule deletions. Otherwise, rule manager 105 determines rules update 400 does not include only rule additions or only rule deletions. In this example, each of the rules in rules update 400 is included in the set of packet processing rules 200. Thus, rule manager 105 determines that that rules update 400 includes only rule additions or only rule deletions.

Many of the examples and embodiments described above involve applying rule addition operations and rule deletion operations to packet processing rules stored in the memory of a network device. In some embodiments, the application of rule addition operations and rule deletion operations can be implemented using any of the techniques described in U.S. patent application Ser. No. 16/446,101, entitled "Method And Network Device For Enabling In-Place Policy Updates," filed Jun. 19, 2019. The entire contents of U.S. patent application Ser. No. 16/446,101 are incorporated herein by reference in its entirety for all purposes.

Figure 10:
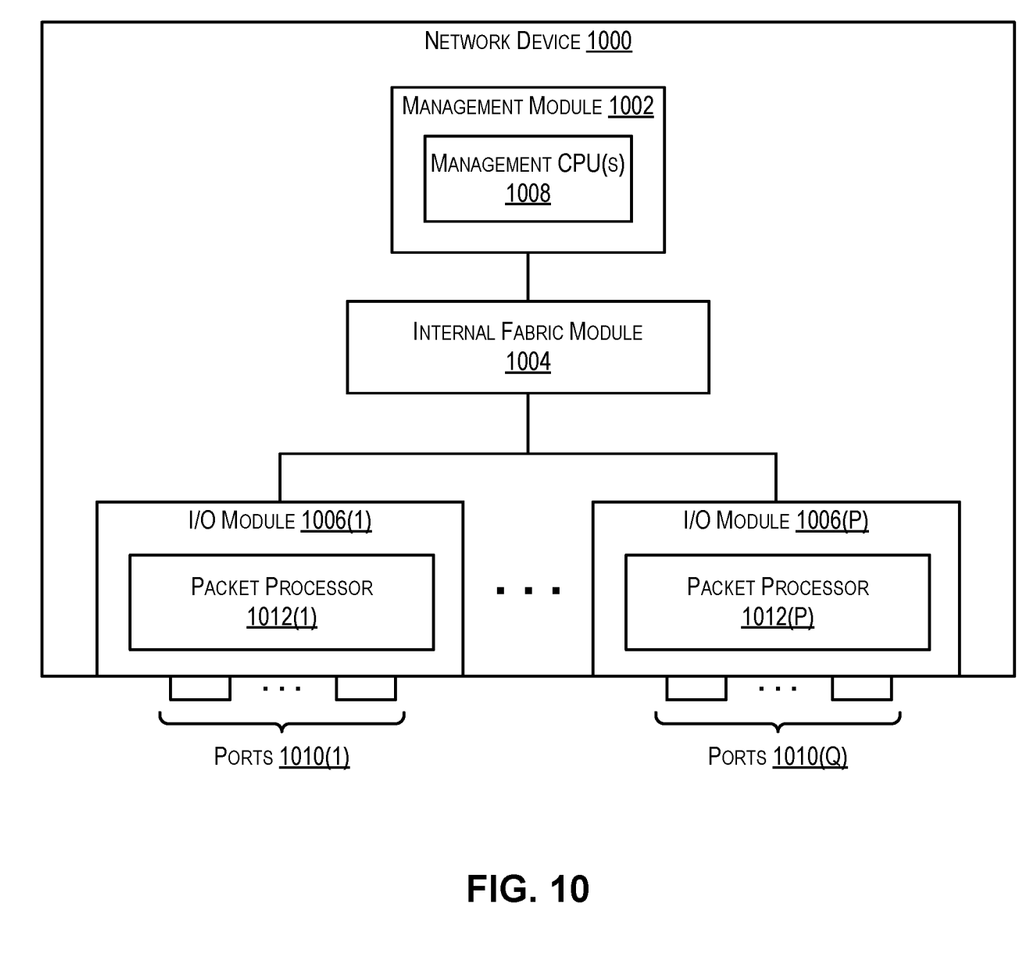
FIG. 10 illustrates an example network device according to some embodiments.

FIG. 10 illustrates the architecture of an example network device (e.g., a network switch or router) 1000 that may implement the techniques of the present disclosure according to certain embodiments. For example, network device 1000 may correspond to each of the network device 100.

Network device 1000 includes a management module 1002, an internal fabric module 1004, and a number of I/O modules 1006(1)-(P). Management module 1002 includes one or more management CPUs 1008 for managing/controlling the operation of the device. Each management CPU 1008 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 1004 and I/O modules 1006(1)-(P) collectively represent the data, or forwarding, plane of network device 1000. Internal fabric module 1004 is configured to interconnect the various other modules of network device 1000. Each I/O module 1006 includes one or more input/output ports 1010(1)-(Q) that are used by network device 1000 to send and receive network packets. Each I/O module 1006 can also include a packet processor 1012, which is a hardware processing component that can make wire speed decisions on how to handle incoming or outgoing network packets.

It should be appreciated that network device 1000 is illustrative and other configurations having more or fewer components than network device 1000 are possible.

In various embodiments, the present disclosure includes systems, methods, and apparatuses for staging in-place updates of packet processing rules of network devices to eliminate packet leaks. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in some embodiments, a non-transitory machine-readable medium stores a program executable by at least one processing unit of a networking device comprising memory. The program comprises sets of instructions for receiving a request to update a first set of rules stored in the memory with a second set of rules; determining whether the update from the first set of rules to the second set of rules satisfies a defined condition; upon determining the update from the first set of rules to the second set of rules satisfies the defined condition, updating the first set of rules in the memory with the second set of rules; and, upon determining the update from the first set of rules to the second set of rules does not satisfy the defined condition decomposing the update from the first set of rules to the second set of rules into a first set of operations and a second set of operations and updating the first set of rules in the memory with the second set of rules by applying the first set of operations before applying the second set of operations, wherein a priority order of the second set of rules are maintained when updating the first set of rules in the memory with the second set of rules.

In some embodiments, the first set of operations comprises storing a subset of the second set of rules in the memory.

In some embodiments, the second set of operations comprises deleting a subset of the first set of rules from the memory.

In some embodiments, the defined condition is the update of the first set of rules stored in the memory with the second set of rules comprises only adding a third set of rules to the first set of rules or only deleting a fourth set of rules from the first set of rules.

In some embodiments, updating the first set of rules in the memory with the second set of rules upon determining the update from the first set of rules to the second set of rules satisfies the defined condition comprises storing the third set of rules in the memory or deleting the fourth set of rules from the memory.

In some embodiments, determining the update from the first set of rules to the second set of rules satisfies the defined condition comprises determining that the first set of rules is a subset of the second set of rules or that the second set of rules is a subset of the first set of rules.

In some embodiments, decomposing the update from the first set of rules to the second set of rules into a first set of operations and a second set of operations comprises determining whether the update from the first set of rules to the second set of rules comprises adding a third set of rules to the first set of rules and, upon determining that the update from the first set of rules to the second set of rules comprises adding the third set of rules to the first set of rules, including the addition of the third set of rules in the first set of operations.

In some embodiments, decomposing the update from the first set of rules to the second set of rules into a first set of operations and a second set of operations comprises determining whether the update from the first set of rules to the second set of rules comprises deleting a fourth set of rules from the first set of rules and, upon determining that the update from the first set of rules to the second set of rules comprises deleting the fourth set of rules from the first set of rules, including the deletion of the fourth set of rules in the second set of operations.

In some embodiments, the memory of the network device is configured to store rules for forwarding network data.

In some embodiments, the memory of the network device comprises ternary content-addressable memory (TCAM).

In some embodiments, a method, executable by a network device comprising memory, receives a request to update a first set of rules stored in the memory with a second set of rules; determines whether the update from the first set of rules to the second set of rules comprises only adding a third set of rules to the first set of rules or only deleting a fourth set of rules from the first set of rules; upon determining the update from the first set of rules to the second set of rules comprises only adding the third set of rules to the first set of rules, adds the third set of rules to the first set of rules; upon determining the update from the first set of rules to the second set of rules comprises only deleting the fourth set of rules from the first set of rules, delete the fourth set of rules from the first set of rules; and, upon determining the update from the first set of rules to the second set of rules does not comprise only adding the third set of rules to the first set of rules or only deleting the fourth set of rules from the first set of rules decomposes the update from the first set of rules to the second set of rules into a set of rule addition operations and a set of rule deletion operations and updates the first set of rules in the memory with the second set of rules by applying the set of rule addition operations to the memory before applying the set of rule deletion operations to the memory by deleting rules in first set or rules from lowest to highest priority, wherein a priority order of the second set of rules are maintained when updating the first set of rules in the memory with the second set of rules.

In some embodiments, the set of rule addition operations comprises storing a subset of the second set of rules in the memory.

In some embodiments, the set of rule deletion operations comprises deleting a subset of the first set of rules from the memory.

In some embodiments, adding the third set of rules to the first set of rules or deleting the fourth set of rules from the first set of rules comprises storing the third set of rules in the memory or deleting the fourth set of rules from the memory.

In some embodiments, determining the update from the first set of rules to the second set of rules comprises only adding the third set of rules to the first set of rules or only deleting the fourth set of rules from the first set of rules comprises determining that the first set of rules is a subset of the second set of rules or that the second set of rules is a subset of the first set of rules.

In some embodiments, decomposing the update from the first set of rules to the second set of rules into a first set of operations and a second set of operations comprises determining whether the update from the first set of rules to the second set of rules comprises adding a third set of rules to the first set of rules and, upon determining that the update from the first set of rules to the second set of rules comprises adding the third set of rules to the first set of rules, including the addition of the third set of rules in the first set of operations.

In some embodiments, decomposing the update from the first set of rules to the second set of rules into a first set of operations and a second set of operations comprises determining whether the update from the first set of rules to the second set of rules comprises deleting a fourth set of rules from the first set of rules and, upon determining that the update from the first set of rules to the second set of rules comprises deleting the fourth set of rules from the first set of rules, including the deletion of the fourth set of rules in the second set of operations.

In some embodiments, the memory of the network device is configured to store rules for forwarding network data.

In some embodiments, the memory of the network device comprises ternary content-addressable memory (TCAM).

In some embodiments, a network device comprises a set of processing units and a non-transitory machine-readable medium storing instructions that when executed by at least one processing unit in the set of processing units cause the at least one processing unit to, upon receiving a request to update a first set of rules stored in the memory with a second set of rules, determine whether the update from the first set of rules to the second set of rules satisfies a defined condition; upon determining the update from the first set of rules to the second set of rules satisfies the defined condition, update the first set of rules in the memory with the second set of rules, wherein a priority order of the second set of rules are maintained when updating the first set of rules in the memory with the second set of rules; and upon determining the update from the first set of rules to the second set of rules does not satisfy the defined condition, block the update from the first set of rules to the second set of rules.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A non-transitory machine-readable medium storing a program executable by at least one processing unit of a networking device comprising memory, the program comprising sets of instructions for:
   receiving a request to update a first set of rules stored in the memory with a second set of rules;
   determining whether the update from the first set of rules to the second set of rules satisfies a defined condition;
   upon determining the update from the first set of rules to the second set of rules satisfies the defined condition, updating the first set of rules in the memory with the second set of rules; and
   upon determining the update from the first set of rules to the second set of rules does not satisfy the defined condition:
      decomposing the update from the first set of rules to the second set of rules into a first set of operations and a second set of operations; and
      updating the first set of rules in the memory with the second set of rules by applying the first set of operations before applying the second set of operations,
   wherein a priority order of the second set of rules are maintained when updating the first set of rules in the memory with the second set of rules.

2. The non-transitory machine-readable medium of claim 1, wherein the first set of operations comprises storing a subset of the second set of rules in the memory.

3. The non-transitory machine-readable medium of claim 1, wherein the second set of operations comprises deleting a subset of the first set of rules from the memory.

4. The non-transitory machine-readable medium of claim 1, wherein the defined condition is the update of the first set of rules stored in the memory with the second set of rules comprises only adding a third set of rules to the first set of rules or only deleting a fourth set of rules from the first set of rules.

5. The non-transitory machine-readable medium of claim 4, wherein updating the first set of rules in the memory with the second set of rules upon determining the update from the first set of rules to the second set of rules satisfies the defined condition comprises storing the third set of rules in the memory or deleting the fourth set of rules from the memory.

6. The non-transitory machine-readable medium of claim 4, wherein determining the update from the first set of rules to the second set of rules satisfies the defined condition comprises determining that the first set of rules is a subset of the second set of rules or that the second set of rules is a subset of the first set of rules.

7. The non-transitory machine-readable medium of claim 1, wherein decomposing the update from the first set of rules to the second set of rules into a first set of operations and a second set of operations comprises:
   determining whether the update from the first set of rules to the second set of rules comprises adding a third set of rules to the first set of rules; and
   upon determining that the update from the first set of rules to the second set of rules comprises adding the third set of rules to the first set of rules, including the addition of the third set of rules in the first set of operations.

8. The non-transitory machine-readable medium of claim 1, wherein decomposing the update from the first set of rules to the second set of rules into a first set of operations and a second set of operations comprises:
   determining whether the update from the first set of rules to the second set of rules comprises deleting a fourth set of rules from the first set of rules; and
   upon determining that the update from the first set of rules to the second set of rules comprises deleting the fourth set of rules from the first set of rules, including the deletion of the fourth set of rules in the second set of operations.

9. The non-transitory machine-readable medium of claim 1, wherein the memory of the network device is configured to store rules for forwarding network data.

10. The non-transitory machine-readable medium of claim 9, wherein the memory of the network device comprises ternary content-addressable memory (TCAM).

11. A method, executable by a network device comprising memory, the method comprising:
- receiving a request to update a first set of rules stored in the memory with a second set of rules;
- determining whether the update from the first set of rules to the second set of rules comprises only adding a third set of rules to the first set of rules or only deleting a fourth set of rules from the first set of rules;
- upon determining the update from the first set of rules to the second set of rules comprises only adding the third set of rules to the first set of rules, adding the third set of rules to the first set of rules;
- upon determining the update from the first set of rules to the second set of rules comprises only deleting the fourth set of rules from the first set of rules, deleting the fourth set of rules from the first set of rules; and
- upon determining the update from the first set of rules to the second set of rules does not comprise only adding the third set of rules to the first set of rules or only deleting the fourth set of rules from the first set of rules:
  - decomposing the update from the first set of rules to the second set of rules into a set of rule addition operations and a set of rule deletion operations; and
  - updating the first set of rules in the memory with the second set of rules by applying the set of rule addition operations to the memory before applying the set of rule deletion operations to the memory by deleting rules in first set or rules from lowest to highest priority,
- wherein a priority order of the second set of rules are maintained when updating the first set of rules in the memory with the second set of rules.

12. The method of claim 11, wherein the set of rule addition operations comprises storing a subset of the second set of rules in the memory.

13. The method of claim 11, wherein the set of rule deletion operations comprises deleting a subset of the first set of rules from the memory.

14. The method of claim 11 wherein adding the third set of rules to the first set of rules or deleting the fourth set of rules from the first set of rules comprises storing the third set of rules in the memory or deleting the fourth set of rules from the memory.

15. The method of claim 11, wherein determining the update from the first set of rules to the second set of rules comprises only adding the third set of rules to the first set of rules or only deleting the fourth set of rules from the first set of rules comprises determining that the first set of rules is a subset of the second set of rules or that the second set of rules is a subset of the first set of rules.

16. The method of claim 11, wherein decomposing the update from the first set of rules to the second set of rules into a first set of operations and a second set of operations comprises:
- determining whether the update from the first set of rules to the second set of rules comprises adding a third set of rules to the first set of rules; and
- upon determining that the update from the first set of rules to the second set of rules comprises adding the third set of rules to the first set of rules, including the addition of the third set of rules in the first set of operations.

17. The method of claim 11, wherein decomposing the update from the first set of rules to the second set of rules into a first set of operations and a second set of operations comprises:
- determining whether the update from the first set of rules to the second set of rules comprises deleting a fourth set of rules from the first set of rules; and
- upon determining that the update from the first set of rules to the second set of rules comprises deleting the fourth set of rules from the first set of rules, including the deletion of the fourth set of rules in the second set of operations.

18. The method of claim 11, wherein the memory of the network device is configured to store rules for forwarding network data.

19. The method of claim 18, wherein the memory of the network device comprises ternary content-addressable memory (TCAM).

20. A network device comprising:
- a set of processing units; and
- a non-transitory machine-readable medium storing instructions that when executed by at least one processing unit in the set of processing units cause the at least one processing unit to:
- upon receiving a request to update a first set of rules stored in the memory with a second set of rules, determine whether the update from the first set of rules to the second set of rules satisfies a defined condition;
- upon determining the update from the first set of rules to the second set of rules satisfies the defined condition, update the first set of rules in the memory with the second set of rules; and
- upon determining the update from the first set of rules to the second set of rules does not satisfy the defined condition:
  - decomposing the update from the first set of rules to the second set of rules into a first set of operations and a second set of operations; and
  - updating the first set of rules in the memory with the second set of rules by applying the first set of operations before applying the second set of operations,
- wherein a priority order of the second set of rules are maintained when updating the first set of rules in the memory with the second set of rules.

* * * * *